(12) United States Patent
Heitmann

(10) Patent No.: US 12,738,179 B2
(45) Date of Patent: Sep. 15, 2026

(54) SIMULATION DOLL

(71) Applicant: EXAC AS, Fredrikstad (NO)

(72) Inventor: Grethe Heitmann, Fredrikstad (NO)

(73) Assignee: EXAC AS, Fredrikstad (NO)

( * ) Notice: Subject to any disclaimer, the term of this patent is extended or adjusted under 35 U.S.C. 154(b) by 360 days.

(21) Appl. No.: 18/285,009

(22) PCT Filed: Mar. 31, 2022

(86) PCT No.: PCT/GB2022/050818

§ 371 (c)(1),
(2) Date: Sep. 29, 2023

(87) PCT Pub. No.: WO2022/208100

PCT Pub. Date: Oct. 6, 2022

(65) Prior Publication Data

US 2024/0212525 A1 Jun. 27, 2024

(30) Foreign Application Priority Data

Mar. 31, 2021 (GB) ..................................... 2104658

(51) Int. Cl.
*G09B 23/32* (2006.01)

(52) U.S. Cl.
CPC .................................... *G09B 23/32* (2013.01)

(58) Field of Classification Search
CPC ...................................................... G09B 23/32
See application file for complete search history.

(56) References Cited

U.S. PATENT DOCUMENTS

| | | | | |
|---|---|---|---|---|
| 3,579,858 A * | 5/1971 | Bentov | .................. | G09B 23/32 434/272 |
| 9,123,261 B2 * | 9/2015 | Lowe | .................. | G09B 23/281 |
| 9,972,219 B2 * | 5/2018 | Garvik | ................. | G09B 23/281 |
| 10,885,813 B2 * | 1/2021 | Krummenacher | ..... | G09B 23/30 |

(Continued)

FOREIGN PATENT DOCUMENTS

| | | |
|---|---|---|
| CN | 202523293 U | 11/2012 |
| CN | 204348211 U | 5/2015 |

(Continued)

OTHER PUBLICATIONS

Douma et al., "Optimization of indirect pressure in order to temporize life-threatening haemorrhage: A simulation study," vol. 47, Issue 9, pp. 1903-1907. 2016.

(Continued)

*Primary Examiner* — Xuan M Thai
*Assistant Examiner* — Sadaruz Zaman
(74) *Attorney, Agent, or Firm* — Jordan IP Law, LLC

(57) ABSTRACT

A haemorrhage training model is disclosed having at least one pump, a model torso with an abdominal region and an inguinal region, and a flexible simulated aorta in the abdominal region which forms an aortic simulation module. The pump is connected to the simulated aorta and arranged to periodically expand and contract it. The simulated aorta is arranged in the abdominal region such that said expansion and contraction can be felt and located on the outer surface of the abdominal region of the model torso by a user. The simulated aorta may be compressed by the user.

14 Claims, 5 Drawing Sheets

(56) References Cited

U.S. PATENT DOCUMENTS

| | | | | |
|---|---|---|---|---|
| 2014/0011172 | A1* | 1/2014 | Lowe | G09B 23/288 434/273 |
| 2015/0032149 | A1* | 1/2015 | Croushorn | A61B 17/135 606/202 |
| 2015/0132733 | A1* | 5/2015 | Garvik | G09B 23/281 434/273 |
| 2017/0193858 | A1* | 7/2017 | Segall | G09B 23/303 |
| 2017/0330488 | A1* | 11/2017 | Kinsella | G09B 23/286 |
| 2019/0333413 | A1* | 10/2019 | Bauer | G09B 23/303 |
| 2019/0378436 | A1* | 12/2019 | Krummenacher | G09B 23/30 |
| 2021/0201699 | A1* | 7/2021 | Eggert | G09B 23/281 |
| 2024/0212525 | A1* | 6/2024 | Heitmann | G09B 23/32 |

FOREIGN PATENT DOCUMENTS

| | | | |
|---|---|---|---|
| CN | 107862967 | A | 3/2018 |
| CN | 107886825 | A | 4/2018 |
| CN | 208861564 | U | 5/2019 |
| CN | 208954463 | U | 6/2019 |
| CN | 209087228 | U | 7/2019 |
| CN | 110767057 | A | 2/2020 |
| GB | 2577097 | | 3/2020 |
| RU | 198996 | U1 | 8/2020 |
| WO | 2013165256 | | 11/2013 |
| WO | 2021019221 | | 2/2021 |

OTHER PUBLICATIONS

Douma et al., “Proximal External Aortic Compression for Life-Threatening Abdominal-Pelvic and Junctional Hemorrhage: An Ultrasonographic Study in Adult Volunteers,” 2018 National Association of EMS Physicians.

* cited by examiner

SIMULATION DOLL

CROSS-REFERENCE TO RELATED APPLICATIONS

This application represents the U.S. National Phase of International Application Number PCT/GB2022/050818 entitled "Simulation Doll" filed on 31 Mar. 2022, which claims benefit to Great Britain patent application number 2104658.6, filed 31 Mar. 2021, all of which are incorporated herein by reference.

BACKGROUND OF THE INVENTION

Minimising haemorrhage, for example because of trauma or complications during medical procedures, using direct compression on the wound is widely taught to, and used by, medical professionals. Tourniquets used on the extremities that apply indirect pressure that reduces the blood flow to bleeding on the limbs are also known. However, indirect pressure, such as external aortic compression (applying pressure on the external abdomen at a location just above the umbilicus), that potentially can temporarily reduce or stop bleeding below the bifurcation of the aorta, is less widely used. Direct compression for pelvic hemorrhage to limit blood loss is often not possible due to the difficulty of providing compression in this region of the body.

Following life-threatening pelvic trauma or post-partum haemorrhage (PPH), external aortic compression may be used to stop blood flow in the abdominal aorta.

Post-partum haemorrhage represents a serious risk to maternal health. This is especially true in developing countries where access to advanced medical treatment facilities is limited. A leading cause of postpartum haemorrhage is uterine atony—the failure of the postpartum uterus to contract adequately following delivery.

External aortic compression is done through the pressure of a fist or knee on the external abdomen which compresses the aorta against the spinal column. This life-saving compression can be done until definite treatment is available. However, temporizing haemorrhaging in the lower abdomen by the use of external aortic compression can only be achieved if the compression is performed correctly.

There is therefore a need to train medical professionals, such as first responders, to provide immediate, life-saving care such as external aortic compression in situations with bleeding caused by e.g. pelvic trauma or post-partum haemorrhage. Simulation models can be used in training to improve the confidence of healthcare workers in managing emergency situations and to improve the quality of care provided to patients.

SUMMARY OF THE INVENTION

When viewed from a first aspect the present invention provides a haemorrhage training model comprising:

- at least one pump; and
- a model torso with an abdominal region, an inguinal region and
  - an aortic simulation module comprising a flexible simulated aorta in the abdominal region,
- wherein the pump is connected to the simulated aorta and arranged to generate a periodic expansion and contraction thereof, the simulated aorta being arranged in the abdominal region such that said expansion and contraction can be felt and located on the outer surface of the abdominal region of the model torso by a user such that the simulated aorta may be compressed by the user.

Thus it will be seen by those skilled in the art that in accordance with the invention a haemorrhage training model is provided having an aortic simulation module which may be used to realistically simulate the pulsing of blood (the heartbeat) and blood pressure, through expansion and contraction of the simulated aorta within the aortic simulation module by a pressure vacuum pump. The training model may therefore provide a means of training a user to perform external aortic compression, through compression of the abdominal region of the model torso to compress the simulated aorta within the aortic simulation module.

In a set of embodiments, the model further comprises a rigid simulated spinal column, with the simulated aorta being arranged adjacent the simulated spinal column. In such embodiments when the simulated aorta is compressed through the abdominal region of the model torso, it may be compressed against the simulated spinal column, thereby reducing or preventing the expansion and contraction thereof, and thus the simulated pulsation and blood pressure in the simulated aorta. Other anatomical structures may also be provided such as simulated costal margin, pubic bone and iliac cresta.

In a set of embodiments, the aortic simulation module further comprises a flexible simulated femoral artery in the inguinal region of the model torso arranged to be expanded and contracted by the pump, thereby simulating pulsing. The pump may therefore be used to pulsate the simulated aorta and simulated femoral artery, to mimic the pulsation of blood in arteries in the human body due to beating of the heart. Such embodiments may therefore additionally enable users to be trained in correctly performing external aortic compression by using a fist or other means to compress the simulated aorta (e.g. against the simulated spinal column), and in order to identify if external aortic compression has been correctly performed, to feel for cessation of pulsation of the simulated femoral artery through the inguinal region of model torso. When correctly performing external aortic compression, the aim is to provide near total arrest of femoral blood flow.

As in the human body, the simulated femoral artery may branch off from the simulated aorta in a pelvic region of the model torso, and be felt in the inguinal region of the model torso. Thus the simulated aorta may be connected directly to the pump, with the simulated femoral artery being expanded and contracted by the pump via the simulated aorta in order to cause it to pulsate.

The simulated aorta and, if provided, simulated femoral artery are both fabricated from a flexible material, e.g. such that they may be easily compressed. This may realistically simulate the feel of the aorta and femoral artery for the user.

The pump may be arranged to expand and contract the simulated aorta and, where provided, simulated femoral artery to simulate the pulsation of blood using a liquid, but in a set of embodiments the pump is arranged to inflate/deflate it/them with a gaseous medium—e.g. air. The pump may therefore be a hydraulic or preferably pneumatic-type pump.

In a set of embodiments, the haemorrhage training model further comprises a uterine simulation module within the model torso, the uterine simulation module comprising a flexible simulated uterus, wherein a pump is connected to the uterine simulation module. The haemorrhage training model may therefore also be used for training of the management of postpartum haemorrhage. The pump may be used to expand and/or contract the simulated uterus. The system may also be fitted with a vacuum pump for contraction of the simulated uterus. The simulated uterus is preferably arranged such that when fully contracted, it feels hard and solid, modelling a correctly contracted uterus following delivery. If the simulated uterus is not fully contracted, it may feel soft, and therefore models an atonic uterus. The user being trained may feel the simulated uterus through the model torso to understand the difference in feel between an atonic and contracted uterus, and to be trained in quickly identifying uterine atony, thus enabling swift treatment to be provided. The model may further be used for training of uterine massage, which is commonly used as a treatment for uterine atony. The model uterus may be fabricated from a flexible material to realistically simulate the feel of a human uterus.

The pump may be arranged to expand and contract the simulated uterus using a liquid, but in a set of embodiments the pump is arranged to inflate/deflate it/them with a gaseous medium—e.g. air.

Separate pumps may be connected to the uterine simulation module and aortic simulation module however, in a set of embodiments, a common pump connected to both the aortic simulation module and the uterine simulation module is provided. In a set of embodiments the common pump is arranged such that it can be switched between operation of the aortic simulation module and the uterine simulation module. In a set of embodiments, the pump is connected to the uterine simulation module and/or aortic simulation module via tubing. This tubing may provide a flexible connection between the pump and uterine simulation module and/or aortic simulation module. The pump may be either manual or electromechanical. A manual pump may be used in models which are to be deployed in areas with poor or no access to electricity. As postpartum haemorrhage represents a serious risk to the health of women giving birth, particularly in rural areas without easy access to advanced medical treatment facilities, having a model which may be used in these areas to train external aortic compression is key to reduce maternal mortality. To facilitate use in rural areas a simple electromechanical haemorrhage training model may also be driven by a battery source. The battery source may be internally integrated into the model, or it may be connected externally to the model.

Embodiments of the invention may contribute to training in communities where there is a lack of advanced health care for women who are victim of postpartum haemorrhage through providing a training model that, in its simplest, purely manual mechanical form, can be used for training of external aortic compression in areas where there is insufficient access to electricity. When people are trained in correctly performing external aortic compression, the compression may be applied in seconds to women after the delivery of the child in cases where the midwife suspects that the woman is suffering from postpartum haemorrhage. The model may further be used for training healthcare providers in the diagnosis of uterine atony, and uterine massage to treat this, which may be of particular benefit in communities where other treatments such as surgery may be delayed.

The haemorrhage training model may be configured as a male or female model, with the female configuration of the training model optionally comprising the uterine simulation module, and the male training model not. Therefore, in a set of embodiments, the uterine simulation module is removable. The same haemorrhage training model may therefore be used for both training of external aortic compression for trauma and postpartum haemorrhage, as well as training of recognition of uterine atony, and uterine massage.

In a set of embodiments, the model torso further comprises a semi-rigid layer above the simulated aorta. This layer may be fabricated from a material which is designed to mimic the feel of muscle and abdominal contents in the body which lies above the aorta. This layer may therefore make the simulated aorta harder to compress. This may improve the external aortic compression training which is provided by the model, as realistically simulating the musculature of the torso means the person being trained will gain an understanding of the force which is required to compress the simulated aorta such that pulsation of the simulated femoral artery ceases. The model may further comprise a system which implements adjustment of the pulsation and pressure to further improve the realistic simulation of the human body. Such a system may be electronic or manually adjusted.

In a set of embodiments comprising a simulated femoral artery, the simulated femoral artery includes a pulsation sensor. The pulsation sensor may form part of a sensing circuit which further comprises indicating means which may be used to indicate when the pulsation ceases due to correctly performed external aortic compression of the simulated aorta. For example, the indicating means, preferably provided somewhere on the model torso, may produce a noise, visual indication or vibration to indicate cessation of pulsation. The indicating means may comprise a light on an internal or external surface of the model torso which may light up when the pulsation sensor detects pulsation has ceased in the simulated femoral artery. The pulsation sensor may further be connected to a wireless transmitter which may send a wireless signal to an external device e.g. a smartphone or computer. The indication that pulsation has ceased may therefore be shown on the device's screen. In a set of embodiments comprising a simulated femoral artery, the model further comprises a flexible bladder or a spring forced piston with a pin indicator. The flexible bladder may also be used as a visual indicator of pulsation cessation and may be a fully mechanical solution and thus well suited for a low cost model. The indicator may also be a spring forced piston with a pin indicator, which may also be a fully mechanical indication solution.

In a set of embodiments, the pump is located in a closed compartment within the model torso. This may minimise the sound produced by the pump, such that the indicating means may be better heard, and instruction may be more easily delivered. The pump may be located at any position within the model torso, and flexible tubing may be used to connect it to the uterine and/or aortic simulation modules.

In another set of embodiments the pump is provided externally of the model torso—e.g. being connected to the model torso using flexible tubing and connections. In such embodiments, the pump may be shared by multiple haemorrhage training models.

The model may also be used to train users in the application of a compression device such as that of WO 2021/019221, which may provide external aortic compression, without the need for a user to compress using their fist, to allow them to perform other clinical tasks. The device may be fixed around the model torso to compress the simulated aorta, with the user feeling the simulated femoral artery to identify if the simulated aorta has been compressed correctly and the compression device has therefore been correctly placed.

The model may further have one or more wired or wireless data connections—e.g. WiFi and/or Bluetooth connections, in order to enable the model to be used for training and performance monitoring purposes from a separate location, even worldwide. A computer may be programmed to display a training course using the model on a display screen.

BRIEF DESCRIPTION OF THE DRAWINGS

Certain embodiments of the invention will now be described, by way of example only, with reference to the accompanying drawings in which.

DETAILED DESCRIPTION OF THE PREFERRED EMBODIMENTS

Figure 1:
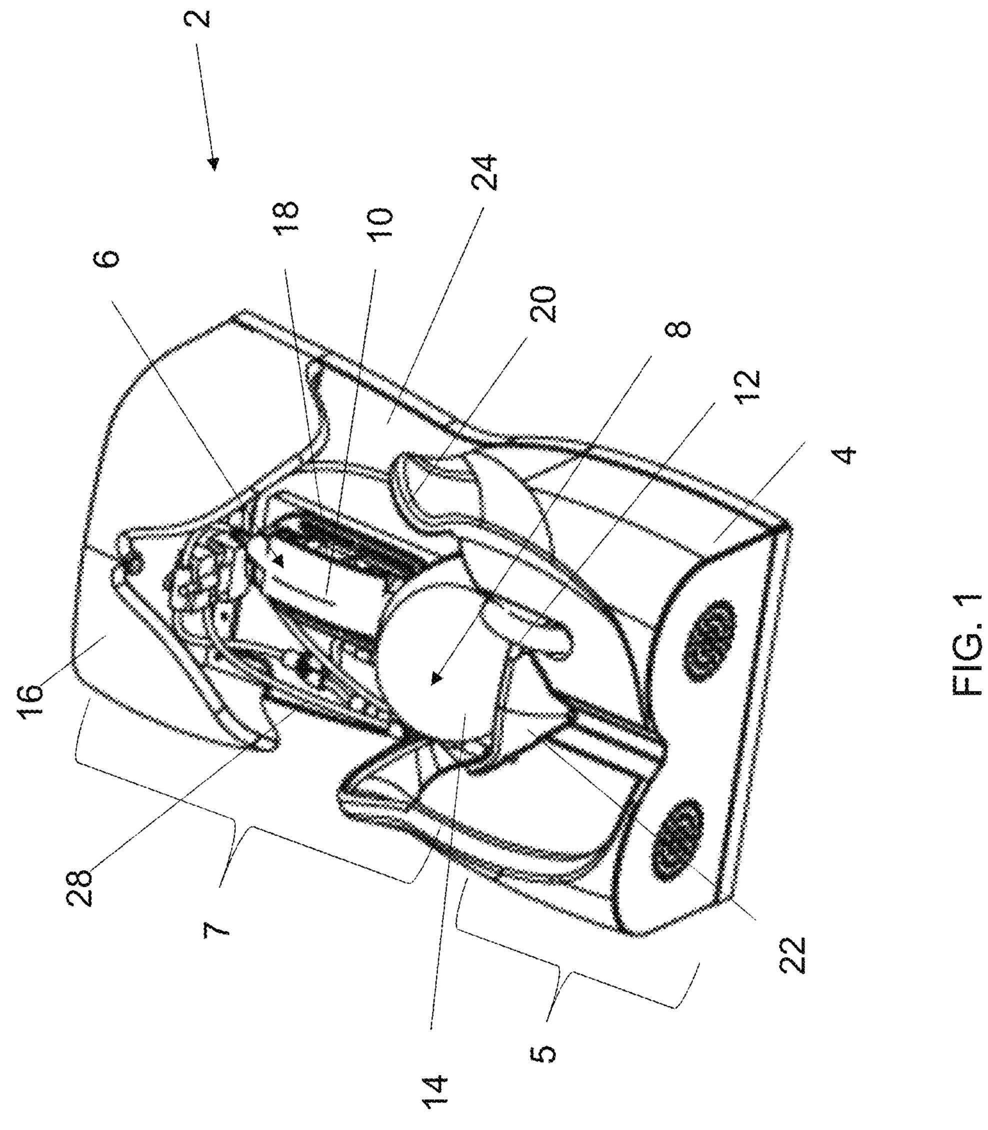
FIG. 1 is an isometric view of a haemorrhage training model in accordance with an embodiment of the present invention.

FIG. 1 is an isometric view of a haemorrhage training model 2 in accordance with the present invention. The haemorrhage training model 2 comprises a model torso 4 with a pelvic region 5 which encloses a pump (see FIG. 2), and an abdominal region 7 enclosing an aortic simulation module 6 and a uterine simulation module 8. FIG. 1 shows the abdominal region 7 of the model torso 4 "open"—without a covering such that the aortic simulation module 6 and uterine simulation module 8 are visible. The pelvic region 5 of the model torso 4 is enclosed such that the pump is not visible in this Figure. The abdominal region 7 of model torso 4 further comprises a simulated costal margin 16, simulated spinal vertebrae 18, simulated iliac cresta 20, and a simulated pubic bone 22 to more realistically simulate a human torso and thus provide improved training to users of the haemorrhage training model 2.

A common pump (see FIG. 2) is connected to both the aortic simulation model 6 and uterine simulation model 8 via flexible tubing 28. The aortic simulation module comprises a simulated aorta 10 and simulated femoral artery 12 which are connected to one another. As in the human body, the simulated femoral artery 12 branches off from the simulated aorta 10 in the pelvic region 5 of the model torso 4. The uterine simulation module 8 comprises a simulated uterus 14 which is arranged above the connection (see FIG. 2) between the simulated aorta 10 and simulated femoral artery 12, within the model torso 4.

As explained above, the model torso 4 comprises a simulated costal margin 16, simulated spinal vertebrae 18, simulated iliac cresta 20, and a simulated pubic bone 22 to realistically simulate the human torso. As such, these are formed from a solid material e.g. rigid plastic, to simulate these bones in the human torso. The costal margin 16 is at one end of the abdominal region 7 of the model torso 4. The spinal vertebrae 18 are arranged beneath the aorta 10, between the aorta 10 and the base 24 of the model torso 4. The base 24 is non-slip, to prevent movement of the haemorrhage model 2 during training. The iliac cresta 20 are on either side of the model torso 4, enclosing two sides of the uterine simulation module 8. The pubic bone 22 encloses one end of the uterine simulation module 8, with the simulated femoral artery 12 arranged next to the pubic bone 22. The simulated costal margin 16, simulated spinal vertebrae 18, simulated iliac cresta 20, and a simulated pubic bone 22 may be attached to the base 24 of the model torso 4 via screwed connections, or another means of rigidly attaching them to the base 24. Alternatively, the connections may allow for the simulated costal margin 16, simulated spinal vertebrae 18, simulated iliac cresta 20, and a simulated pubic bone 22 to be easily removed e.g. for ease of storage, transport and maintenance.

Unlike the costal margin 16, spinal vertebrae 18, iliac cresta 20 and pubic bone 22, the simulated aorta 10, simulated femoral artery 12 and simulated uterus 14 are fabricated from a flexible material which may be compressed and manipulated. In use, the haemorrhage training model 2 may also include a flexible cover (see FIG. 3) which would enclose the interior of the model torso 4, mimicking the skin on a human torso. This also ensures that when the model 2 is used for training, personnel must rely on feel and dexterity, rather than vision, as would be the case when working on a patient.

Figure 2:
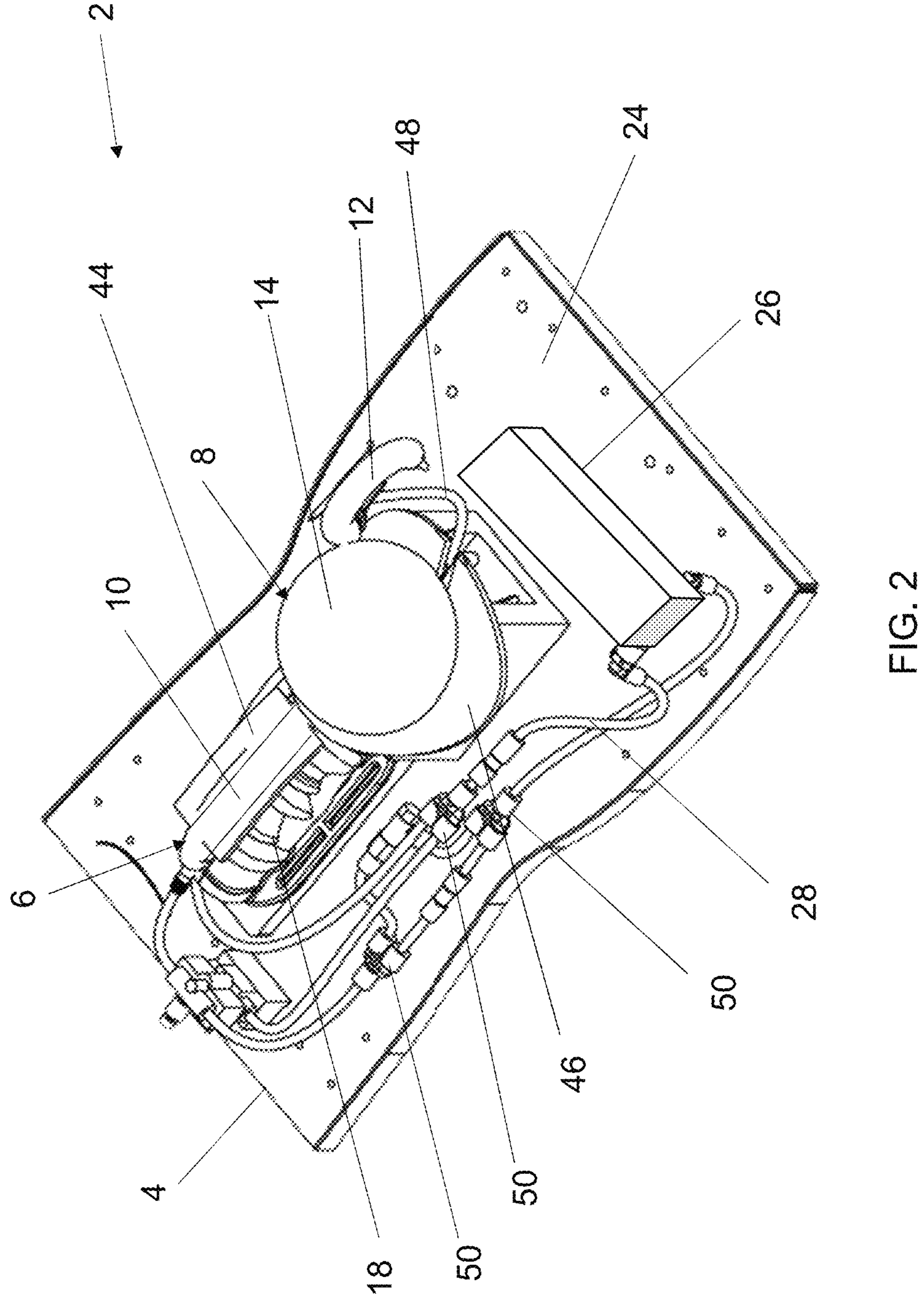
FIG. 2 is an isometric view of the internal structure of the haemorrhage training model of FIG. 1.

FIG. 2 further shows the interior of the model torso 4 of the haemorrhage training model 2—without the simulated costal margin 16, simulated spinal vertebrae 18, simulated iliac cresta 20 and simulated pubic bone 22, such that the pump 26 is visible. As is clear from FIG. 2, the pump 26 is connected, via flexible tubing 28 and valves 50, to the simulated aorta 10, and thus to the simulated femoral artery 12, as well as to the simulated uterus 14. An aorta support 44 is arranged between the simulated spinal vertebrae 18 and the simulated aorta 10, to support the simulated aorta 10. A uterus support 46 is arranged between the simulated uterus 14 and the connection 48 between the simulated aorta 10 and simulated femoral artery 12, to support the simulated uterus 14. The pump 26 is connected to the base 24 of the model torso 4 via a connection which may be fixed, or allow the pump 26 to be removed e.g. for maintenance.

The pump 26 is an electromechanical air pump, however it is envisaged that the pump may be purely mechanical (see FIG. 5), for use in areas where there is insufficient electricity access. In further embodiments the pump may be a hydraulic pump.

Figure 3:
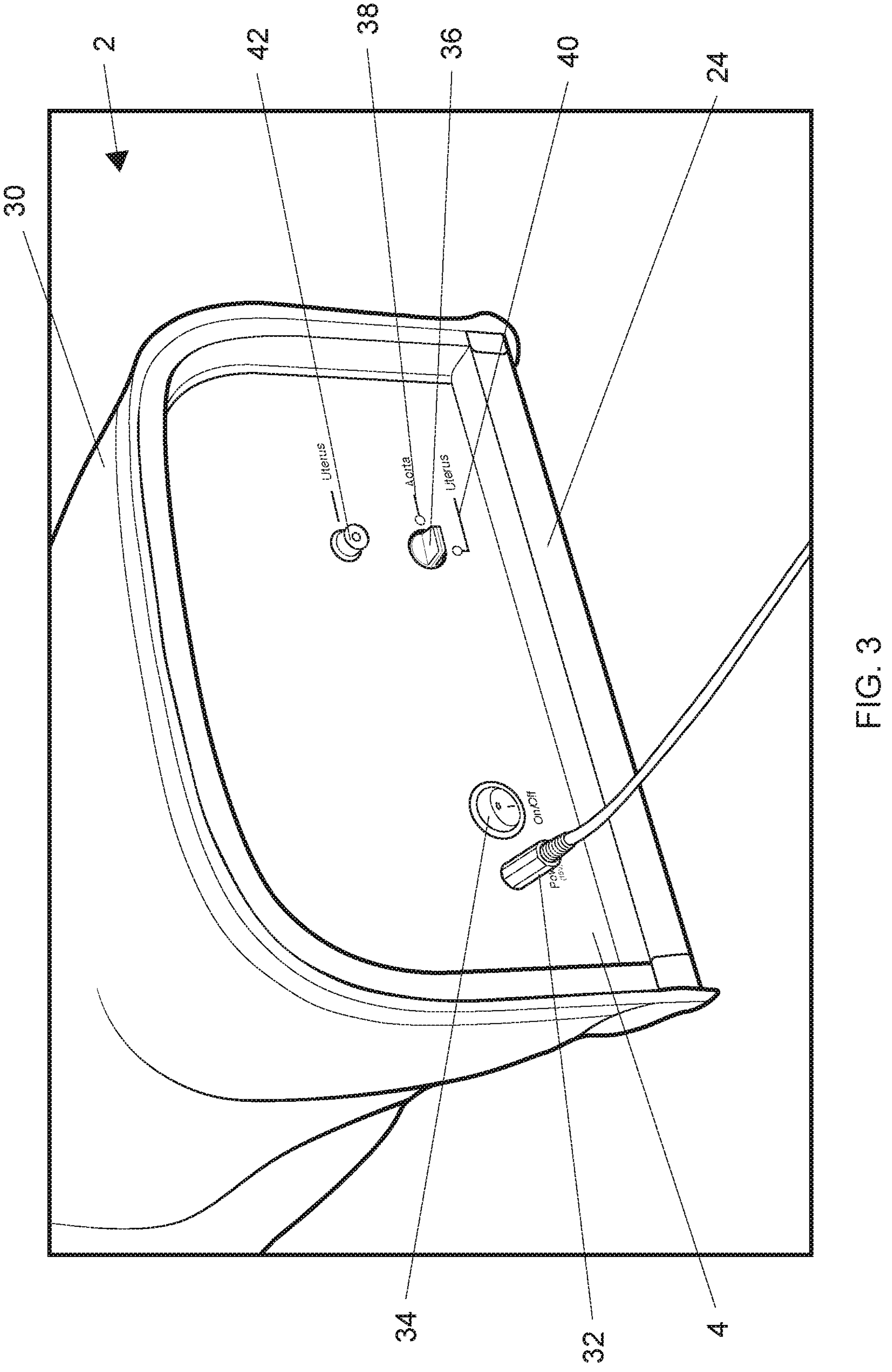
FIG. 3 is an image of the end of the haemorrhage training model in use.

FIG. 3 is an image of an end of the haemorrhage training model 2. A flexible cover 30 covers the model torso 4 and is attached to the base 24 of the model torso 4 to enclose the interior of the training model 2. A power supply 32 is provided to the model 2. This power supply provides electricity to the electromechanical pump 26 such that the pump 26 may be used to inflate/deflate/pulse the simulated aorta 10, simulated femoral artery 12, and simulated uterus 14. A switch 34 is used to power on and power off the pump 26. A switch 36 is used to switch the pump 26 between acting on the aortic simulation module 6, in which case the switch 36 is at the position 38, and acting on the uterine simulation module 8, in which case the switch 36 is at position 40. This switch 36 acts on the valves 50 of FIG. 2 to switch operation of the pump between the aortic simulation module 6 and the uterine simulation module 8.

Figure 4:
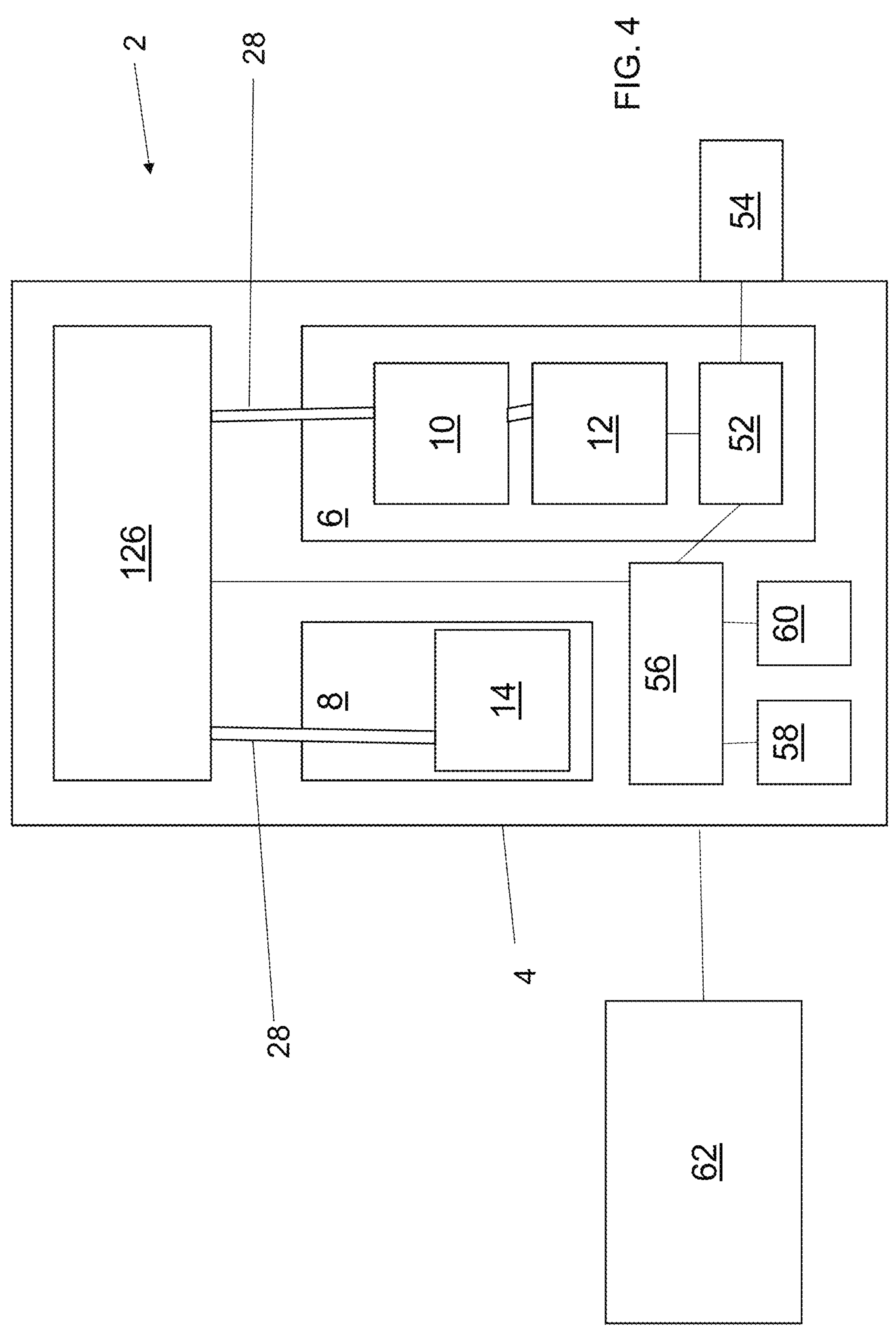
FIG. 4 is a simplified schematic diagram of the haemorrhage training model of FIG. 1.

FIG. 4 is a simplified, purely functional diagram of the haemorrhage training model 2. As previously described, the model torso 4 surrounds the electromechanical pump 26, flexible tubing 28, aortic simulation module 6, and uterine simulation module 8. A pulsation sensor 52 is connected to the simulated femoral artery 12 and is further connected (via a sensor circuit) to an indicator light 54 which is connected to the outside of the model torso 4 and is therefore visible to a user. A processor 56 is also connected to the pump 126, and a WiFi transceiver 58 and Bluetooth module 60 are connected to the processor 56. A screen 62 is also connected to the model torso 4.

In use for postpartum haemorrhage training, the uterine module 8 and pump 26 may be used to simulate uterine atony—the failure of the uterus to contract adequately following delivery. As uterine atony is the most common cause of postpartum haemorrhage, accurate simulation of this when training medical professionals is key so that it may be recognised early.

In additional embodiments, the model uterus 14 may be fabricated from an expanding material such that it self-expands to simulate the atonic uterus.

The pump 26 is connected to the model uterus 14 via the tubing 28. The pump 26 may therefore be used to pump air into the model uterus 14 to fully expand it, such that it "feels soft"—this simulates an atonic uterus following delivery. A button 42 may be used to deflate the model uterus 14 to simulate uterine contraction, for training of uterine massage techniques when the switch 36 is at position 40 such that the pump 26 is connected to the uterine simulation module via the tubing 28 and valves 50. The person being trained will therefore be able to feel the model uterus 14 through a flexible cover (see FIG. 3) which encloses the interior of the model torso 4. The model 2 therefore enables training to be provided in external palpation to diagnose uterine atony, and may further be used for training of uterine massage—placing a hand on the lower abdomen and using repetitive and squeezing movements to attempt to "stimulate" the model uterus 14. The trainer may then press the button 42 to cause the model uterus 14 to contract. The processor 56 may be connected to the buttons 34, 42 and switch 36 to control the pump 126. The WiFi transceiver 58 and/or Bluetooth module 60 may receive wireless signals which may be used to control the pump 126 instead of using the switches 34, 42, 36.

Further to this, the model 2 may be used for training of external aortic compression, a method of stopping postpartum haemorrhage, where the pressure of a fist or knee on the external abdomen which compresses the aorta against the spinal column. The valves 50 provide a selective connection between pump 26, the uterine simulation module 8 and/or the aortic simulation module 6. The valves 50 may be electrically connected to an external switch (see FIG. 3) for switching the connection, and thus function of the model 2, or alternatively they may be manual values—especially in the case of a manual model such as that described with reference to FIG. 5.

As explained above, the simulated aorta 10 is arranged above the aorta support 44 and the simulated spinal vertebrae 18. The pump 26 is used to inflate the simulated aorta 10 and simulated femoral artery 12, and to cause pulsation of the simulated aorta 10 and simulated femoral artery 12 to mimic the pulsation of blood in arteries due to beating of the heart.

This pulsation in the simulated femoral artery 12 is felt by the person being trained using the model 2. To practice external aortic compression using the model 2, the person being trained will press their fist or knee against the simulated aorta 10 through a flexible cover (see FIG. 3) which encloses the interior of the model torso 4. If the external aortic compression has been performed correctly, this will result in near total arrest of "femoral blood flow" due to compression of the simulated aorta 10 against the aorta support 44 and the solid simulated spinal vertebrae 18. The trainee may then press their fingers against the simulated femoral artery 12 through a flexible cover 30 (see FIG. 3) which encloses the interior of the model torso 4, and if they can feel no pulsation of the simulated femoral artery 12, then they can identify that external aortic compression has been correctly performed. A pulsation sensor 52 and indicator light 54 (see FIG. 4) may also be used to detect cessation of pulsation in the simulated femoral artery 12 and visibly indicate this to the user of the model 2. The pulsation sensor 52 is used to determine when pulsation ceases due to correctly performed external aortic compression of the simulated aorta 10. As such, if external aortic compression results in the cessation of pulsation in the simulated femoral artery 12, this will be detected by the pulsation sensor 52, and the indicator light 54 will therefore light up, providing a visible confirmation to the user that the compression has been performed correctly. The pulsation sensor 52 may further be connected to the WiFi transceiver 58 and/or Bluetooth module 60 via the processor 56. The WiFi transceiver 58 and/or Bluetooth module 60 may send a wireless signal to an external device e.g. a smartphone or computer. The signal may also be sent to the external screen 62. The indication that pulsation has ceased may therefore be shown on the screen 62. The screen may further be used to display a training video for users who are training using the simulation model 2.

Figure 5:
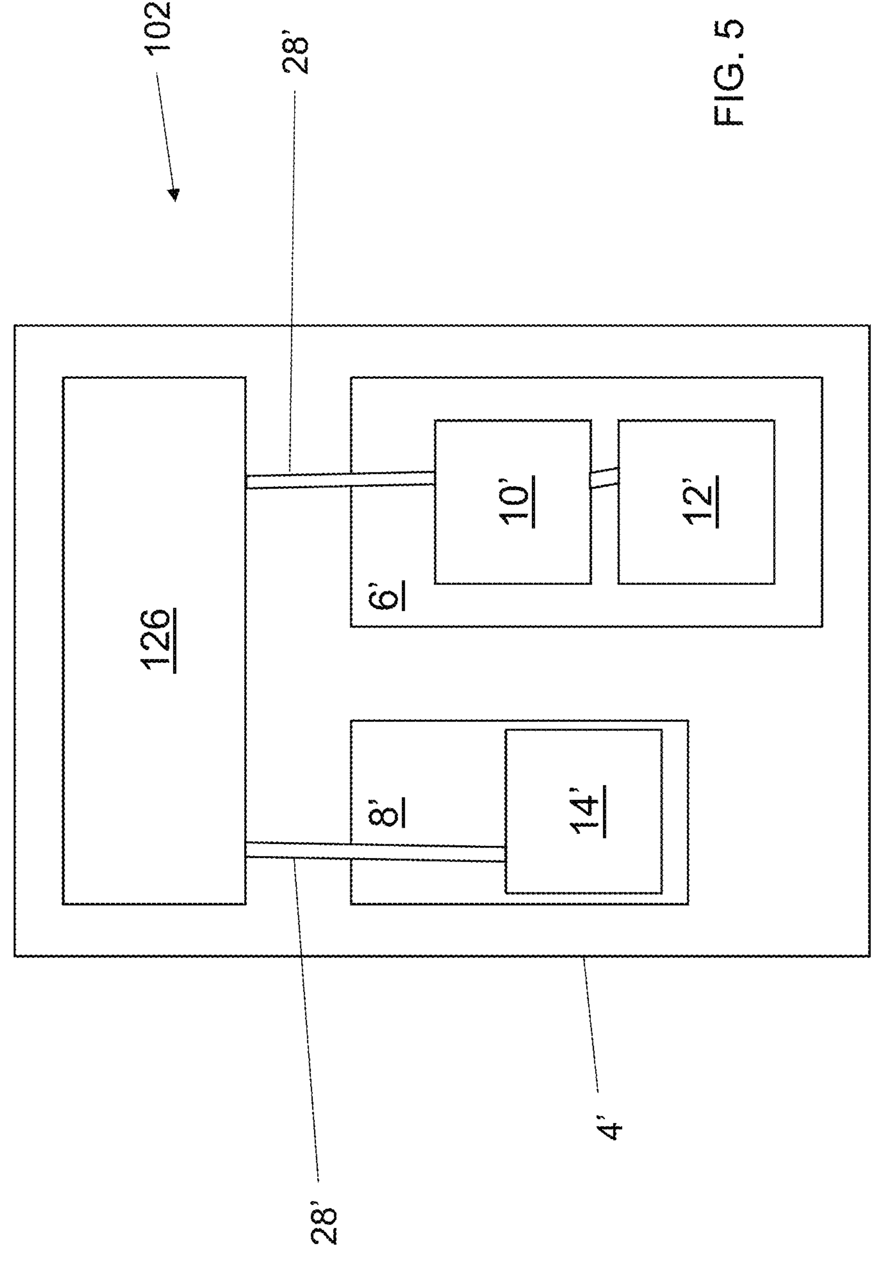
FIG. 5 is a schematic diagram of another embodiment of the haemorrhage training model which is purely mechanical.

FIG. 5 is a purely functional diagram of another embodiment of the haemorrhage training model 102 which is purely manually operated. The model torso 4', essentially identical to that described with reference to the previous embodiment would in use surround a manual mechanical pump 126, tubing 28', aortic simulation module 6', and uterine simulation module 8' in a similar manner to the previous embodiment. The mechanical pump 126 is connected via tubing 28' to the simulated aorta 10', and thus to the simulated femoral artery 12' of the aortic simulation module 6, and to the simulated uterus 12' of the uterine simulation module 8'. As the pump 126, and therefore training model 102 is purely manually operated, with no electronic components, this embodiment of the invention is suited for training of external aortic compression in less developed countries. Women in these countries are at particular risk of death from postpartum haemorrhage, and the mechanical training model 102 may therefore be used to train people to provide this life-saving treatment.

It will be appreciated by those skilled in the art that the invention has been illustrated by describing one or more specific embodiments thereof, but is not limited to these embodiments; many variations and modifications are possible, within the scope of the accompanying claims. For example, the model may be used for training of other situations requiring manual aorta compression such as life-threatening blunt trauma and/or injuries below the diaphragm. The model may be male or female shaped, for example the model will not include a uterine simulation module if it is a male model.

The invention claimed is:

1. A haemorrhage training model comprising:

at least one pump; and a model torso with an abdominal region, an inguinal region and an aortic simulation module comprising a flexible simulated aorta in the abdominal region, wherein the pump is connected to the simulated aorta and arranged to generate a periodic expansion and contraction thereof, the simulated aorta being arranged in the abdominal region such that said expansion and contraction can be felt and located on the outer surface of the abdominal region of the model torso by a user such that the simulated aorta may be compressed by the user.

2. The haemorrhage training model as claimed in claim 1 comprising a rigid simulated spinal column, wherein the simulated aorta is arranged adjacent to the simulated spinal column such that it can be compressed against the simulated spinal column through the abdominal region of the model torso, thereby reducing or preventing the expansion and contraction thereof.

3. The haemorrhage training model as claimed in claim 1, wherein the aortic simulation module comprises a flexible simulated femoral artery in the inguinal region of the model torso, arranged to be expanded and contracted by the pump thereby causing the simulated femoral artery to pulsate.

4. The haemorrhage training model as claimed in claim 3, wherein the simulated femoral artery branches off from the simulated aorta in a pelvic region of the model torso, and can be felt in the inguinal region of the model torso.

5. The haemorrhage training model as claimed in claim 3 wherein the simulated femoral artery comprises a pulsation sensor.

6. The haemorrhage training model as claimed in claim 5 comprising a sensing circuit, wherein the sensing circuit comprises indicating means configured to indicate whether pulsation ceases due to correctly performed external aortic compression of the simulated aorta.

7. The haemorrhage training model as claimed in claim 1 comprising a uterine simulation module within the model torso, the uterine simulation module comprising a flexible simulated uterus, wherein a pump is connected to the uterine simulation module, and arranged to expand and/or contract the simulated uterus.

8. The haemorrhage training model as claimed in claim 7, wherein the uterine simulation module is configured to be removable.

9. The haemorrhage training model as claimed in claim 8, wherein the pump is connected to both the aortic simulation module and the uterine simulation module, and is arranged such that it can be switched between operation of the aortic simulation module and the uterine simulation module.

10. The haemorrhage training model as claimed in claim 1 wherein the periodic expansion and contraction provided by the pump comprises inflating and deflating the simulated aorta, and, where provided, a/the simulated femoral artery, and where provided, a/the simulated uterus with a gaseous medium.

11. The haemorrhage training model as claimed in claim 1, wherein the pump is electromechanical and is driven by a battery source.

12. The haemorrhage training model as claimed in claim 1, wherein the pump is located in a closed compartment within the model torso.

13. The haemorrhage training model as claimed in claim 1 comprising a system which implements adjustment of the pulsation and pressure.

14. The haemorrhage training model as claimed in claim 1, comprising one or more wired or wireless data connections.

* * * * *